United States Patent [19]

Liepa et al.

[11] 4,110,255

[45] Aug. 29, 1978

[54] BEVERAGE CARBONATION DEVICE

[75] Inventors: Alexander L. Liepa, Wyoming; Cornelis H. Japikse, Springfield Township, Hamilton County, both of Ohio

[73] Assignee: The Procter & Gamble Company, Cincinnati, Ohio

[21] Appl. No.: 739,663

[22] Filed: Nov. 8, 1976

Related U.S. Application Data

[60] Division of Ser. No. 489,292, Jul. 7, 1974, Pat. No. 4,007,134, which is a continuation-in-part of Ser. No. 445,200, Feb. 25, 1974, abandoned.

[51] Int. Cl.$^2$ .............................................. B01J 29/06
[52] U.S. Cl. .......................... 252/455 Z; 261/121 R; 426/67
[58] Field of Search ................ 252/455 Z; 261/121 R; 426/67; 55/75

[56] References Cited

U.S. PATENT DOCUMENTS

| | | | |
|---|---|---|---|
| 2,973,327 | 2/1961 | Mitchell et al. | 252/455 Z |
| 3,888,998 | 6/1975 | Sampson et al. | 426/67 |
| 4,007,134 | 2/1977 | Liepa et al. | 252/455 Z |

*Primary Examiner*—Carl F. Dees
*Attorney, Agent, or Firm*—Leonard Williamson

[57] ABSTRACT

A rigid composite body containing crystalline molecular sieves and having liquid-permeable channels extending in a substantially vertical direction from one surface of said body to the interior thereof, preferably to an opposite surface, is charged with carbon dioxide so that when brought in contact with water or an aqueous beverage, the carbon dioxide will be released from the molecular sieve composite body to carbonate the solution. Such rigid, composite bodies are secured in a sealable, nestable, stackable container which provides a convenient and efficient means for dispensing such composite bodies in combination with a dry instant beverage mix for the preparation of carbonated beverages upon the addition of water.

26 Claims, 5 Drawing Figures

BEVERAGE CARBONATION DEVICE

CROSS-REFERENCE TO RELATED APPLICATION

This application is a divisional of commonly assigned, co-pending application Ser. No. 489,292, filed July 7, 1974 which issued on Feb. 8, 1977 as U.S. Pat. No. 4,007,134, which in turn is a continuation-in-part of commonly assigned, then co-pending application Ser. No. 445,200, filed on Feb. 25, 1974 and now abandoned.

BACKGROUND OF THE INVENTION

This invention relates to a novel device adapted to the carbonation of aqueous beverages at the point of consumption. Carbonation is accomplished by contacting the beverage to be carbonated with "molecular sieves", i.e., crystalline aluminosilicates, which contain adsorbed gaseous carbon dioxide. Carbon dioxide is released from the molecular sieves by displacement with water from the beverage solution. The liberated carbon dioxide is then dissolved into the liquid to form the carbonated beverage. The molecular sieves are bonded into a monolithic structure having sufficient surface area for contact between the aqueous beverage to be carbonated and the molecular sieves so as to provide means for a ready displacement of the carbon dioxide to be released by water from the beverage solution.

Commercial beverage carbonation usually involves carbon dioxide-liquid contact under pressure with intensive mixing in a cooled container. Such commercial methods, of course, require elaborate and sophisticated equipment not available at the point of beverage consumption.

Several simple carbonation techniques which are suitable for home use have been disclosed in the art. Most commonly, such prior art carbonation systems utilize a chemical "couple" to generate carbon dioxide in situ within the beverage to be carbonated. Such a couple usually consists of the combination of an inorganic carbonate such as sodium bicarbonate and an edible food acid such as citric acid or an acid-acting ion exchange resin. Contact between compounds of this type in an aqueous solution results in the formation of gaseous carbon dioxide and the salt of the food acid. Several patents (Mitchell et al., U.S. Pat. No. 3,241,977, issued May 22, 1966; Mitchell et al., U.S. Pat. No. 3,467,526, issued Sept. 16, 1969; Hovey, U.S. Pat. No. 3,492,671, issued Jan. 27, 1970; and Hughes, U.S. Pat. No. 2,742,363, issued Apr. 17, 1956) describe preferred embodiments of such acid-bicarbonate or acid resin-bicarbonate systems in detail. All of these methods, however, result in the formation of undesirable off-tasting organic salts in solution or require utilization of complex ion exchange material to prevent these salts from dissolving in the beverage. Such salts are particularly noticeable and objectionable to the consumer when formed in substantial amounts in achieving relatively high levels of carbonation.

Another home carbonation technique utilizes dry beverage compositions containing water-reactive carbonic acid anhydrides which release $CO_2$ or $H_2CO_3$ in aqueous solution, for example, see U.S. Pat. No. 3,441,417, issued Apr. 29, 1969, to Feldman et al. These compositions, however, require rather complex formulation and, in many instances, require incorporation of a buffering system into the beverage solution.

Thus, it has been proposed in co-pending patent application Ser. No. 302,149, filed Oct. 30, 1972 now U.S. Pat. No. 3,888,998, which is a continuation-in-part of application Ser. No. 200,849, filed Nov. 22, 1971 now abandoned, that aqueous beverages could be advantageously carbonated at the point of consumption with the use of an effective amount of a crystalline aluminosilicate molecular sieve material having adsorbed therein at least about 5% by weight of carbon dioxide. Molecular sieves of the types used in carbonating beverages at the point of consumption are crystalline aluminosilicate materials of the following general formula:

$$M_{2/n}O:SiO_2:aAl_2O_3:bH_2O$$

in the salt form, where $M$ is a metallic cation, ordinarily Na or K with other cations substituted possibly be exchange, $n$ is the valence of said metal cation M, $a$ is the number of moles of alumina and $b$ is the number of moles of water of hydration.

Upon removal of at least some of the water of hydration by heating, or "firing", the crystalline aluminosilicates become highly porous and are characterized by a series of surface cavities and internal pores which form an interconnecting network of passageways within the crystal. As used herein, the term "firing" means heating in a kiln or by other suitable means so as to at least partially remove the water of hydration from the bodies to be fired. It specifically excludes vitrification of said bodies. Such dehydrated molecular sieves are often referred to as "activated" meaning that they are ready to adsorb carbon dioxide or other available molecules. Due to the crystalline nature of such materials, the diameters of the surface cavities and of the internal pores are substantially uniform and of molecular magnitude. For this reason, the crystalline aluminosilicates have found wide use in the separation of materials according to molecular size or configuration, hence the name "molecular sieves".

Carbonation in accordance with the latter-named method necessitates contacting the molecular sieves with the beverage liquid. Generally, the molecular sieves loaded with $CO_2$ are placed in a container, and the liquid to be carbonated is then added in sufficient amount to cover the sieves. Heretofore, in copending application Ser. No. 302,149, referred to above, carbonation has been accomplished by utilizing a multiplicity of small molecular sieve agglomerates, such as produced following the teachings of U.S. Pat. No. 2,973,327, issued Feb. 28, 1961, to William J. Mitchell et al., or by utilizing a solid disk of compressed molecular sieves. The agglomerates are typically either spherical in shape, commonly known as beads, or roughly cylindrical in shape, commonly known as pellets.

The use of a multiplicity of molecular sieve agglomerates, however, is disadvantageous due to the disadvantages inherent in using the small particles. Since the molecular sieve agglomerates are not in themselves designed for internal consumption, the molecular sieve bodies must be enveloped or otherwise constrained so as to be readily separable from the liquid beverage upon consumption. These various encasements of the molecular sieve bodies may have economical, aesthetic, or other disadvantages which preclude their use for commercial marketing purposes. A composite molecular sieve body would overcome many of these disadvantages inherent in the use of a multiplicity of small agglomerates. However, there are severe technical problems in formulating a suitable monolithic structure. A solid molecular sieve disk, or tablet, made from either compressed molecular sieves or from a mixture of aluminosilicates bonded together with a clay mineral binder tends to be unsatisfactory in that these bodies have encountered problems when used for carbonating liquid beverages. In order to obtain sufficient carbonation of the aqueous beverage, that is, both a sufficient amount of $CO_2$ released into the beverage and a minimal rate of $CO_2$ generation to maintain the beverage in a carbonated state, the molecular sieves must have adsorbed therein at least a certain amount of $CO_2$. However, when these solid disks which contain an effective amount of gaseous carbon dioxide are placed in the liquid beverage environment, the pressure generated by the carbon dioxide release from the molecular sieves is often so extreme as to cause disintegration or destruction of the disk body. If precautions are taken to prevent this, specifically, using a binder composition which imparts sufficient strength to the composite body so as to maintain its structural integrity, then the binder causes a decrease in the rate of release of the carbon dioxide. This can result in either unacceptably low carbonation levels or unacceptably long carbonation times.

Accordingly, it is an object of the present invention to formulate a rigid composite molecular sieve body which, when adsorbed with an effective amount of carbon dioxide, will satisfactorily carbonate an aqueous beverage without the destruction or dissolution of said composite molecular sieve body.

It is also an object of this invention to provide bonded molecular sieve disks which effectively carbonate a beverage in a commercially acceptable time period.

It is a further object of the instant invention to provide simple but effective devices for point of consumption beverage carbonation. These and other objects readily apparent to those skilled in the art will be apparent from the disclosure and appended claims.

SUMMARY OF THE INVENTION

The present invention provides a rigid composite body comprising a crystalline zeolite molecular sieve and, optionally, a binder material, said body being especially suitable for carbonating aqueous beverages at the point of consumption without separating the molecular sieve material from the carbonated beverage. The rigid composite body of the present invention has a plurality of substantially parallel elongated channels extending from one surface of the body to the interior thereof, and preferably to an opposite surface, with the longitudinal axis of the elongated channels substantially parallel to the axis of the vertical dimension of the composite body. Such rigid composite bodies as are produced by the present invention provide a convenient and economical carbonation system for both individual and multiple servings of carbonated beverages. They can readily be combined with a suitable liquid-containing vessel to provide unique point-of-consumption carbonated beverages.

BRIEF DESCRIPTION OF THE DRAWINGS

Although the specification concludes with claims particularly pointing out and distinctly claiming the subject matter forming the present invention, it is believed that the same will be better understood by reference to the following specification taken in connection with the accompanying drawings in which:

Figure 1:
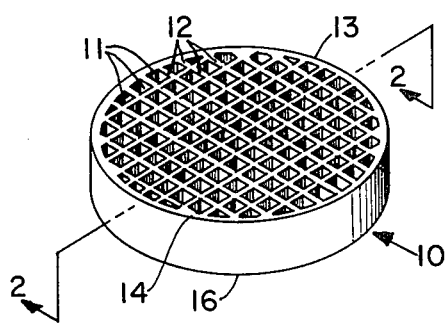
FIG. 1 is a perspective view of a preferred embodiment of the present invention wherein the rigid composite crystalline zeolite body is in the shape of a thick disk having numerous elongated channels running substantially parallel to the vertical dimension of the body.

While the invention will be described in connection with the preferred embodiments illustrated in the figures, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

To obtain the necessary carbon dioxide adsorption capability needed to carbonate a beverage at the point of consumption, it has been found necessary to employ molecular sieves since some common adsorbents, such as charcoal and silica gel, do not have the adsorptive capacity necessary for this purpose. Molecular sieves, or crystalline aluminosilicates, are also sometimes referred to as crystalline zeolites and are of both natural and synthetic origin. Natural crystalline aluminosilicates exhibiting molecular sieve activity include, for example, analcite, paulingite, ptilolite, clinoptilolite, ferrierite, chabazite, gmelinite, levynite, erionite, and mordenite.

Since not all of the natural crystalline aluminosilicates are available in abundance, considerable attention has been directed to the production of synthetic equivalents. Three basic types of crystalline aluminosilicate molecular sieves most readily available on a commercial scale have been given the art-recognized designation of "zeolite A", "zeolite X" and "zeolite Y". Other molecular sieves which have been synthesized include Zeolites B, F, G, H, K-G, J, L, M, K-M, Q, R, S, T, U, and Z.

Zeolite A and the methods of preparation thereof are defined and disclosed in U.S. Pat. No. 2,882,243, issued Apr. 14, 1959, to Robert Milton. In the Milton U.S. Pat.

No. 2,882 herein incorporated in its entirety by reference, Zeolite A is defined compositionally in terms of molar ratios of oxides as:

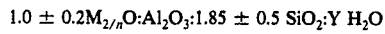
$$1.0 \pm 0.2 M_{2/n}O:Al_2O_3:1.85 \pm 0.5 SiO_2:Y H_2O$$

wherein M represents at least one of the materials in the group consisting of hydrogen, ammonium, metals in groups I and II of the periodic table, and the transition metals of the periodic table, n represents the valence of M, and Y may be any value up to about 6 and having an X-ray powder diffraction pattern essentially as shown in the following Table:

| d Value of Reflection in A |
|---|
| 12.2 ± 0.2 |
| 8.6 ± 0.2 |
| 7.05 ± 0.15 |
| 4.07 ± 0.08 |
| 3.68 ± 0.07 |
| 3.38 ± 0.06 |
| 3.26 ± 0.05 |
| 2.96 ± 0.05 |
| 2.73 ± 0.05 |
| 2.60 ± 0.05 |

The metal represented in the formula above by the letter M can be changed by conventional ionic exchange techniques. The sodium form of zeolite A, designated sodium zeolite A, or simply as NaA molecular sieve, is the most convenient form of zeolite A to manufacture. For this reason the other forms of zeolite A are usually obtained by the modification of sodium zeolite A.

Zeolite X and the methods of preparation thereof are defined and disclosed in U.S. Pat. No. 2,882,244, issued Apr. 14, 1959, to Robert Milton. In the Milton U.S. Pat. No. 2,882,244, incorporated herein in its entirety by reference, Zeolite X is defined compositionally in terms of molar ratios of oxides as:

$$0.9 \pm 0.2 M_{2/n}O:Al_2O:Al_3:2.5 \pm 0.5 SiO_2:Y H_2O$$

wherein M represents at least one cation having a valence of not more than 3, n represents the valence of M, and Y may be any value up to about 8, the atoms of said material being arranged in a unit cell having an X-ray powder diffraction pattern essentially as shown in the following Table:

| d Value of Reflection in A |
|---|
| 14.42 ± 0.2 |
| 8.82 ± 0.1 |
| 4.41 ± 0.05 |
| 3.80 ± 0.05 |
| 3.33 ± 0.05 |
| 2.88 ± 0.05 |
| 2.79 ± 0.05 |
| 2.66 ± 0.05 |

Again, the metal represented in the formula above by the letter M can be changed by conventional ion exchange techniques. The sodium form of the zeolite X, designated sodium zeolite X, or simply as NaX molecular sieve, is the most convenient form of zeolite X to manufacture. For this reason the other forms of zeolite X are usually obtained by the modification of sodium zeolite X.

Zeolite Y and the method of preparation thereof are defined and disclosed in U.S. Pat. No. 3,130,007 issued Apr. 21, 1964 to Donald Breck. In the Breck patent, incorporated herein in its entirety by reference, zeolite Y is defined compositionally in terms of molar ratios of oxides as:

$$0.9 \pm 0.2 Na_2O:Al_2O_3: w SiO_2: x H_2O$$

wherein w is a value greater than 3 and up to about 6 and x is a value up to about 9, and having an X-ray powder diffraction pattern essentially the same as that shown in Table A of U.S. Pat. No. 3,130,007.

Several specific types of molecular sieves are particularly useful for employment in the instant beverage carbonation composite body. (In the following description references to molecular sieves by "Types" all refer to materials presently commercially available from the Material Systems Division of Union Carbide Co. Generic designations such as NaA, NaX, CaA, and CaX refer respectively to sodium zeolite Z, sodium zeolite X, calcium zeolite A, calcium zeolite X, etc.). These include 4A and 13X molecular sieves. Type 4A (NaA) has a 4 Angstrom pore size and can be characterized by the chemical formula:

$$Na_{12}[(AlO_2)_{12}(SiO_2)_{106}] \cdot 27 H_2O.$$

Type 13X (NaX) has a 10 Angstrom pore size and can be characterized by the chemical formula:

$$Na_{86}[(AlO_2)_{86}(SiO_2)_{106}] \cdot 276 H_2O.$$

With both the Type 4A and 13X molecular sieves, the sodium ions can be exchanged with other cations, such as potassium and calcium, to provide varying pore sizes and somewhat different adsorption characteristics. For example, the Type 4A molecular sieve having approximately 70% of its sodium cations exchanged for calcium cations yields a molecular sieve marketed commercially by the Union Carbide Corp. as Type 5A (CaA) having a 5 Angstrom pore size. Likewise, the Type 13X (NaX) molecular sieve having about 70% of its sodium cations exchanged for calcium cations is marketed commercially by the Union Carbide Corp. as Type 10X (CaX) having an 8 Angstrom pore size. Another molecular sieve, the Type 3A has a potassium zeolite A (KA) structure and a 3 Angstrom pore size.

It is also possible to commercially obtain crystalline aluminosilicate molecular sieves which are classified as "acid-resistant." Acid-resistant molecular sieves are crystalline zeolites which do not structurally degrade and from which metal ions are not leached upon prolonged contact with low pH solutions. Such acid-resistant molecular sieves are usually prepared by removing or replacing with protons many of the exchangeable metal ions found in natural and synthetic molecular sieves. This is accomplished by first exchanging metal ions with ammonium ions and subsequently heating the resulting ammonium form of such molecular sieves to about 400° C to decompose the ammonium cations. Although the exchangeable metal ions in all crystalline metal aluminosilicates can be removed or replaced to some extent by this procedure, in most cases complete ion exchange of this type destroys the crystal structure of the zeolite. In order to replace more than 35% of the zeolite metal ions without destroying the aluminosilicate crystal, those zeolites having an $SiO_2/Al_2O_3$ molar ratio greater than 3:1 are employed in the above-described ion exchange processes. Zeolites having such a high $SiO_2/Al_2O_3$ molar ratio include the natural mineral faujasite and the synthetic sodium zeolite Y (NaY). The process for lowering the metal ion content of crystalline metal aluminosilicates is described more fully in U.S. Pat. Nos. 3,130,006, issued Apr. 21, 1964, to Jule A. Rabo, et al., and 3,460,904, issued Aug. 12, 1969, to Dean A. Young, incorporated herein by reference in their totality.

Examples of commercially available acid-resistant molecular sieves produced by the metal ion removal process described above include Type AW-300 molecular sieve which has a 4 Angstrom pore size, Type AW-500 molecular sieve which has a 5 Angstrom pore size, Type SK-40 (NaY in finely divided powder form) and Type SK-41 (NaY in particulate form with a clay binder) molecular sieves both having a pore size of 8–10 Angstroms and the Zeolon Series 100, 200, 300, 500, and 900 presently marketed by the Norton Co. The latter-mentioned Zeolon Series are natural and synthetic mordenites which give excellent results when used in the practice of the present invention.

For purposes of the present invention, the material adsorbed within the molecular sieve composite body is, of course, gaseous carbon dioxide. Carbon dioxide is strongly adsorbed on such sieves, but is readily displaced by the stronger and preferential adsorption of water. Hence, release of the adsorbed carbon dioxide from molecular sieves in aqueous solution provides the basis for the carbonation technique utilized in the present invention.

The total amount of carbon dioxide capable of being adsorbed by the molecular sieves and the rate of desorption, that is, the rate at which the carbon dioxide is released by the molecular sieves by displacement with water molecules, varies with the pore size of the molecular sieves. Thus, varying the pore size of the molecular sieves employed in the instant invention, that is, utilizing different molecular sieve types in the formulation of the composite body, affects both the carbonation rate and the final carbonation level of the aqueous beverage.

In general, molecular sieve types having smaller pore sizes (3–5 Angstroms and particularly 3–4 Angstroms) release carbon dioxide for a longer period of time and have a lower initial rate of release. Molecular sieves having larger pore openings (greater than 6 Angstroms) provide relatively high initial release rates of carbon dioxide but such release is not sustained over as long a period of time. The ability of an aqueous solution to dissolve carbon dioxide is inversely related to the degree of saturation thereof. During initial carbonation, carbon dioxide can be dissolved at a comparatively high rate while lower rates prevail as the solution approaches saturation. Thus, it is advantageous to utilize a molecular sieve type that exhibits a high initial carbon dioxide release rate, since such a molecular sieve type would carbonate an aqueous beverage more quickly. It has been found that NaX, NaY and ion-exchanged smaller pore size molecular sieves all exhibit excellent carbonation characteristics when used in the practice of the present invention. However, the use of smaller pore size molecular sieves is not intended to be excluded from the practice of the present invention, since excellent carbonated beverages have also been obtained using other molecular sieves having smaller pore sizes. Generally, molecular sieves having a pore size of from 3 to 12 Angstroms are suitably employed.

It is also possible to employ mixtures of molecular sieve types to obtain particular carbonation characteristics desired. For systems wherein both high initial carbon dioxide release and sustained carbon dioxide dissolution are desired, this can be realized by employing mixtures of sieves having varying pore sizes.

Various molecular sieve forms ranging from powder (0.5–12 microns) to ¼ inch diameter spheres are commercially available, with most of the non-powdered forms incorporating a binder of inert clay at a 20% by weight level. Common sieve forms include extruded 1/16 and ⅛ inch diameter pellets and 4 × 8 and 8 × 12 mesh beads, i.e., spheres which will pass through an 8 mesh screen, but not through a 12 mesh screen. But as has been previously described, these known agglomerates have disadvantages inherent in the small particle size for application in carbonating aqueous beverages at the point of consumption. It has been found that in keeping with the present invention, in order to obtain the mechanical strength necessary for a point-of-consumption carbonation composite body, a suitable binder material must normally be used with the molecular sieves. However, if a molecular sieve material is sufficiently cohesive, then there is no requirement that a binder material be added to the molecular sieves in forming the composite bodies of the present invention. The most common of these self-binding zeolite molecular sieves are synthetic mordenites, commercially available as Zeolon 900, and some faujasites. Those skilled in the art can readily ascertain the self-binding characteristic of any particular zeolite from published references.

It is to be noted that in a preferred embodiment, the composite body of the present invention is composed of a geometrical array of substantially uniform, relatively thin walls. Thus, any binder material employed must provide a composite body with sufficient mechanical strength to withstand shocks received in normal handling and processing of these bodies. The mechanical strength which a suitable binder imparts to the composite bodies prevents the monolithic structures from being fractured into small pieces when subjected to mechanical shocks (crush strength), or from surface molecular sieves being scraped from the body surface in the form of dust when the bodies are rubbed against an adjacent object (attrition resistance).

Further, the binder must be such that the mechanical strength of the carbonation bodies is not significantly lessened upon immersion of the body in an aqueous beverage. Accordingly, a binder must be employed which maintains the mechanical strength of the composite bodies in an aqueous environment, particularly one with a relatively low pH, as is commonly encountered with carbonated beverages.

In carrying out the present invention, it must be borne in mind that one of the critical features of the composite bodies is their ability to adsorb and retain comparatively large amounts of carbon dioxide for later release in an aqueous beverage. Thus, one of the most important, if not the most important characteristic of a binder for use in the present invention, is that it must not significantly affect the adsorptive capacities of the molecular sieves. Any binder which interferes with the molecular sieves in such a way as to reduce their adsorptive capacity to below about 5% by weight of the uncharged body is unsuitable for use in the formation of the carbonation bodies of the present invention.

However, an adverse affect on the adsorption capacities of the molecular sieves is to be distinguished from an affect on the carbon dioxide release rate of the various molecular sieves. It has been found that the rate of release of carbon dioxide from the charged bodies is not only dependent upon the type of molecular sieves present, but upon the binder material used and the amount of binder employed in forming the composite body. Thus, by a manipulation of the binder material, for example, by varying the type of binder used, by combining various different binders, or by varying the respective proportions of a particular combination of binders, one skilled in the art can obtain any of a wide range of carbonation rates from one molecular sieve type. Conversely stated, any particular carbonation rate is not dependent upon a unique combination or proportion of binder materials, but may be obtained by employing various binders, or combinations thereof with a number of different molecular sieve types.

The present invention envisions the molecular sieve composite bodies immersed in, or otherwise brought into intimate contact with, the beverage to be carbonated. Accordingly, it is critical that the binder material used does not impart any inedible foreign matter or deleterious compounds to the liquid beverage. It is preferred that the binder material be relatively inert so as not to impart any undesirable off-flavors to a beverage to be carbonated; however, it is essential only to employ a binder which does not contribute any inedible or harmful matter to the aqueous beverage which is consumed.

In the practice of the present invention, the most common binders used are mineral clays; however, non-clay binders can be advantageously employed as long as they meet the criteria set forth above, i.e., imparting mechanical strength to and not affecting the adsorption characteristics of the molecular sieves, and not imparting any foreign matter or compounds into the beverage to be carbonated. Examples of non-clay binder materials suitable for use in the present invention are hydraulic or plastic cements, silicone rubber compounds, and plastic resins. The examples below illustrate the use of both clay and non-clay binders in the practice of the present invention.

Of course, as mentioned above, the most common binder materials used will be clay minerals. Examples of clays which can be employed as suitable binding materials for use with the molecular sieves are attapulgite and attapulgite-type clays, kaolin and kaolin-type clays, kaolinite, sepiolite, polygarskite, plastic ball clays, bentonite and bentonite-type clays, montmorillonite, illite, and chlorite. It has been determined that a combination of kaolin and bentonite clays provides a particularly satisfactory binder material which imparts mechanical strength to the composite body without adversely affecting the adsorptive capacities of the molecular sieves.

The amount of clay used in making the composite body of the present invention depends upon the strength required in the final product and the degree of dilution of the molecular sieves permissible to maintain an adequate carbonation rate and total amount of carbonation release. For most purposes, the clay content of from about 5% to about 35% by weight of the final body is satisfactory with a preferred range for most applications being from 15% to 25% of clay by weight of the composite body. However, good results have been obtained with a clay content of as little as about 1% and as high as about 60% by weight of the body, since the only real upper limitation is one of practicality. Of course, if the molecular sieves used are sufficiently cohesive, then no additional binder is necessary. In forming the composite bodies of the present invention, a larger size body must be employed to obtain the same total carbon dioxide adsorption capacity if the percentage of clay binder is increased relative to an amount of molecular sieves, since it is the latter component which determines the carbon dioxide adsorption capacity of the composite body. Accordingly, the composite bodies of the present invention comprise from about 40% to 100% molecular sieve material. As stated above, a satisfactory composition when a binder material is necessary comprises from about 95% to about 65% molecular sieves and from about 5% to about 35% binder.

Also in accordance with the present invention, the composite bodies may contain any of a number of optional materials, as long as the ultimate use of the bodies, i.e., carbonating an aqueous beverage, is not adversely affected thereby. The following are given merely as illustrations of the various types of optional materials which may be incorporated into the composite bodies without adversely affecting the carbonation utility of the bodies. Various materials, such as Texas talc or calcined talc, may be added to decrease the amount of shrinkage of the composite body during firing. Other materials may be added to aid in the processing of the composite bodies before firing. These processing aids could include, for example, de-flocculants, such as sodium silicate, sodium hexametaphosphate, sodium tetrapyrophosphate, or co-plasticizers, such as guar gum. Of course, those skilled in the art will appreciate that there are a large number of such optional materials which may be added to the composite bodies of the present invention without adversely affecting their adsorption capacities.

In keeping with the present invention, the composite bodies are prepared by blending or mixing the molecular sieves, a suitable binder material, if the molecular sieves are not sufficiently cohesive, and any desired optional materials, and forming the mixture into a suitable composite body. The composite bodies may be formed by any means known in the art. For example, U.S. Pat. No. 2,973,327, issued Feb. 28, 1961, to William J. Mitchell et al., incorporated herein by reference in its entirety, discloses several methods of producing agglomerates of molecular sieves. In light of the teachings of the present invention, methods of forming agglomerates disclosed in Mitchell et al. may be adapted by those skilled in the art to form the composite bodies suitable for carbonating beverages. A preferred method involves blending together the molecular sieves, a clay binder, desired optional ingredients and sufficient moisture to render the mixture pliant. The mixture is extruded through a die to form a long cylindrical body with elongated channels running longitudinally through it, cut into bodies of the appropriate thickness, dried, and fired to activate the molecular sieves. Any other means of forming the composite body known in the art, such as compaction, press-molding, or the like may also be used since any particular means of forming the composite body is not critical to the practice of the present invention.

In forming the composite bodies of the present invention, it may be necessary to remove some loose particulate surface matter before the bodies are immersed in an aqueous beverage to be carbonated. This can conveniently be accomplished before activation by the use of a water-washing, surface grinding, or other known operation and serves to provide a smooth surface with greater attrition resistance.

In forming a monolithic carbonation device, it has been found that a body, in the shape of a solid body, provides unsuitable results. The two main problems encountered are an unacceptably slow rate of carbon dioxide release and a destruction of the body when placed in an aqueous environment. This latter problem is believed to be caused by internal pressures resulting from the carbon dioxide being released from the molecular sieves, but unable to be released from the solid disk at an adequate rate.

To solve these problems, it has been found necessary to provide a minimum critical surface area:mass ratio of at least about 4 cm$^2$/g in forming a molecular sieve composite body suitable for point-of-consumption beverage carbonation. This minimum surface area:mass ratio assures adequate interface to achieve a suitable carbon dioxide release rate which prevents any internal pressure buildup and achieves a rapid carbonation rate. A preferred minimum surface area:mass ratio for the carbonation bodies of the present invention is about 10 cm$^2$/g.

Of course, the theoretical maximum surface area:mass ratio is that of an individual molecular sieve crystal. For purposes of the present invention, however, the maximum practical surface area:mass ratio is dependent only upon the technical capabilities of one skilled in the art to form a composite body with sufficient mechanical strength to be able to withstand normal processing and handling shocks. This maximum practical surface area:mass ratio is found to be about 200 cm$^2$/g. Normally, the surface area:mass ratio will be in the range of about 6 cm$^2$/g. to about 50 cm$^2$/g., with a preferred range being from about 10 cm$^2$g. to about 24 cm$^2$/g.

In the practice of the present invention it has been found that the most practical means for achieving this minimum surface area:mass ratio and still retain sufficient mechanical strength needed to withstand normal handling and processing shocks, is to form the composite bodies with a plurality of elongated channels extending from one surface to the interior of the composite body, and preferably extending from one surface to an opposite surface of the body. In a preferred embodiment of the present invention, the composite bodies are in the shape of disks with elongated channels passing from one planar surface to an opposite planar surface; however, the present invention is not intended to be limited thereto. Rather, it is intended to cover molecular sieve composite bodies of all geometrical shapes and dimensions with channels, holes, cells, apertures or cavities of any size or cross-sectional configuration. It is readily apparent that one skilled in the art can form the molecular sieve composite bodies of the present invention into a myriad of different configurations. It is to be remembered, however, that the present invention is not dependent upon any particular geometrical configuration, but embraces all such monolithic configurations which meet the surface area:mass ratio specification given above. In the most preferred embodiment, the composite bodies are in the shape of a disk of from about 1 inch to about 4 inches in diameter and from about ¼ inch to about 2 inches thick. Most preferably, there are from about 75 to about 225 elongated channels extending from one planar surface to an opposite planar surface, each channel having a mean diameter, or length along one side if the channels are not circular in cross section, of from about 0.06 inch to about 0.2 inch, with 0.075 inch to about 0.15 inch being especially preferred. Of course, the diameter, or length along one side, of the channels depends upon the number of channels and the wall thickness, the latter of which is most preferably from about 0.02 inch to about 0.1 inch in thickness.

In keeping with the present invention, the composite bodies must have a carbon dioxide adsorption capacity sufficient to be able to adsorb a releasable amount of carbon dioxide sufficient for carbonation purposes. Thus, it has been found that in addition to the minimum surface area:mass ratio given above, a single composite body must contain from about 0.5 grams to about 4 grams (before charging) and preferably from about 0.67 grams to about 2 grams of molecular sieves per fluid ounce of beverage to be carbonated. Thus, a single composite body must contain at least about 6 g. and preferably, at least about 8 g. molecular sieves to assure adequate carbon dioxide adsorption capacity to be suitable for carbonating a 12 fl. oz. aqueous beverage. Of course, if a multiplicity of bodies were to be used with a single beverage portion or if a smaller-sized beverage portion were contemplated, a correspondingly smaller amount of molecular sieves would be needed in each composite body. Conversely, if a contemplated application involved carbonating a larger beverage portion with a single composite body, a correspondingly greater amount of molecular sieves material would be necessary to provide adequate carbonation performance.

Turning now to the drawings, in FIG. 1, there is shown a rigid composite body 10 which is a preferred embodiment of the present invention having a plurality of elongated channels 11 extending from one surface of the rigid composite body to an opposite surface, thus allowing the unhindered passage of air and other fluids in the direction of the vertical dimension of the body. The plurality of elongated channels 11 are separated one from another by the walls 12 which, in fact, define the form of the composite body. The walls 12 define the periphery 13 with upper and lower edges 14 and 16 of the composite body 10 and extend between opposing sides of the composite body so as to partition the interior of the body into the discrete elongated channels 11.

Figure 2:
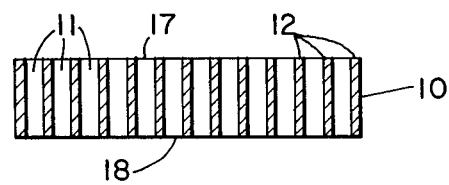
FIG. 2 is a vertical sectional view of the body of FIG. 1 taken on the line 2—2 through FIG. 1 dissecting a row of elongated channels and illustrating in detail the structure of the preferred embodiment molecular sieve composite body with the elongated channels extending from one surface of said body to an opposite surface with the longitudinal axis of the elongated cells being substantially parallel to the axis of the vertical dimension of the composite body.

As best shown in FIG. 2, the elongated channels 11 extend longitudinally through the composite body 10 from one surface 17 to an opposite surface 18 so as to permit the unhindered passage of fluids in the direction of the vertical axis of the composite body. It has been found that the illustrated embodiment having the channels extending all the way through the body is much preferred in that it promotes a regular and desirable current flow when the charged composite body is placed in an aqueous environment. As the carbon dioxide is released from the molecular sieves, small bubbles are formed which rise to the surface of the beverage. With channels extending through the body, the rising gas bubbles induce the liquid to enter the channels from the bottom, setting up a radially symmetrical convection current in a conventional vessel. This promotes both a faster carbonation rate and dissolution of any added flavoring ingredients.

FIG. 2 also illustrates the feature of a preferred embodiment 10 in which the channels 11 extend substantially parallel to the vertical dimension of the composite body. This also aids in a more efficient carbonation of the beverage, as the small carbon dioxide bubbles released from each channel separately rise to the surface. If the channels extended substantially transverse to the vertical dimension of the body, almost all the carbon dioxide bubbles would rise from the periphery of the body and result in a less efficient carbonation of the beverage. As used herein, the term "vertical" is used in its popular sense to denote the height dimension of the composite body when said body is in the position of greatest equilibrium with respect to the bottom of a vessel in which it is placed. Of course, those skilled in the art will appreciate that for some geometric configurations, such as a sphere or tetrahedron, there is more than one position of greatest equilibrium. In such an instance, the vertical dimension is logically the height dimension of the body when placed in any one such position.

Figure 3:
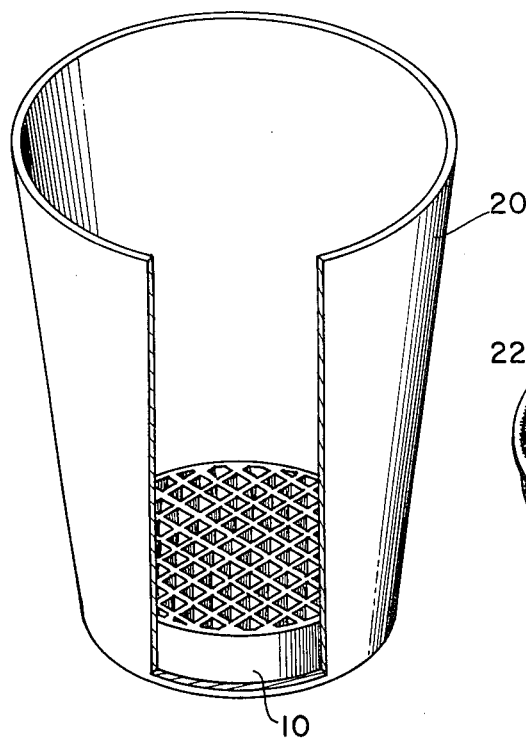
FIG. 3 is a cut-away perspective view of a drinking vessel which can be used to prepare a carbonated beverage illustrating the composite body of FIG. 1 within the drinking vessel.

To illustrate the applications of the present invention, FIG. 3 illustrates the preferred embodiment 10 of the present invention in place at the bottom of a drinking vessel 20. The composite body may be held in place at the bottom of the vessel by the use of an insoluble adhesive, by pressing the disk into the bottom of a conical flexible cup, or, more simply, by merely allowing the composite body to rest at the bottom of the cup since the specific gravity of the carbon dioxide charged composite body is greater than that of water, which, of course, will cause the composite body to remain at the bottom of an aqueous beverage.

Figure 4:
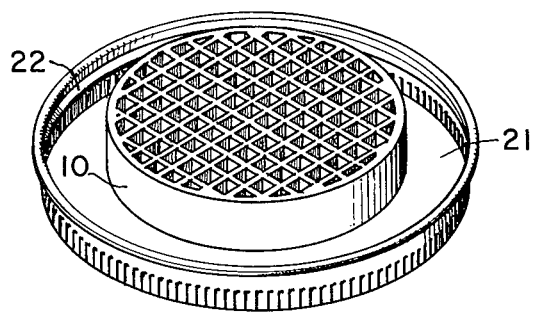
FIG. 4 is a perspective view of another embodiment of the present invention illustrating the composite body of FIG. 1 fixedly secured to the inner side of the top of a container, which may be securely attached to a beverage-containing vessel so as to achieve contact between the composite body and the beverage upon inversion of the vessel.

FIG. 4 illustrates the carbonation device 10 of the present invention fixedly secured to the inner side of a container top 21 which may be securely attached to a vessel (not shown), suitable for containing liquids. The top 21 may have screw threads 22 or other means, such as a rubber seal or clamp (not shown) any of which are suitable for providing a sealable container when the top 21 is secured to the liquid-containing vessel, or container. The liquid to be carbonated is poured into the container and the top 21 with the carbon dioxide-charged monolithic molecular sieve body 10 attached thereto is securely placed on the vessel. The vessel is then inverted to bring the aqueous beverage to be carbonated into contact with the charged molecular sieve body 10 to effect carbonation. After the beverage is suitably carbonated, the vessel is again inverted so as to permit removal of the top without spilling of the beverage. The carbonated beverage may then be poured into individual drinking vessels for consumption of the carbonated beverage.

Figure 5:
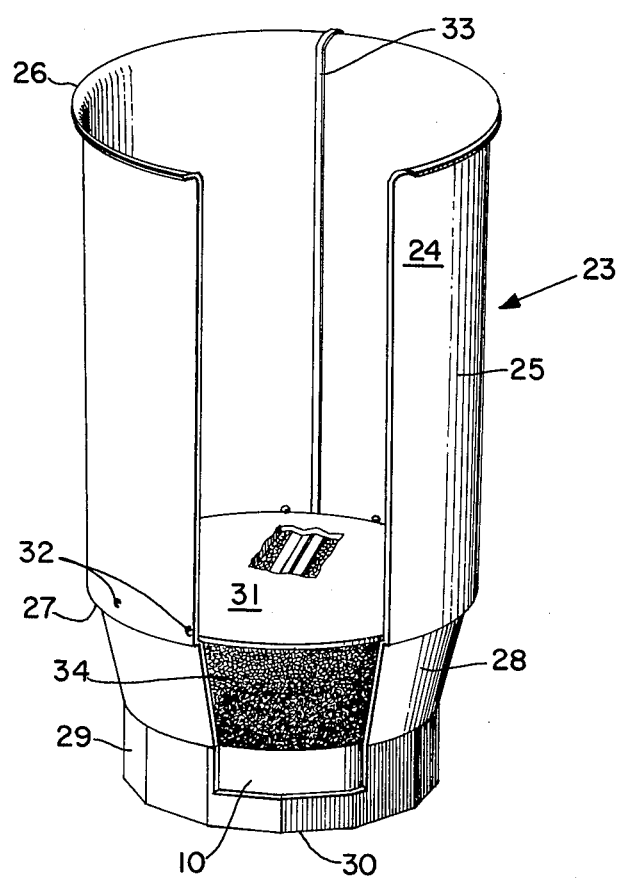
FIG. 5 is a cut-away perspective view of another preferred embodiment of the present invention illustrating the composite body of FIG. 1 in combination with a specially designed drinking vessel and dry beverage mix to provide a convenient and economical device from which flavorful carbonated beverages may be prepared.

FIG. 5 illustrates the carbonation device 10 of the present invention in combination with, and forming a part of, a unique carbonated beverage serving package, indicated generally at 23. The serving package 23 comprises a drinking vessel 24 which is most conveniently of the disposable variety, which vessels are conventionally made of a paper, fiber sheet, or a type of plastic material so as to be discarded after use. The vessel 24 is here shown to be composed of a frustoconical first side wall segment 25 extending from an upper bead, or lip, 26 to shoulder 27, a second frustoconical side wall segment 28 extending from shoulder 27 to a duodecagonal side wall segment 29, which latter side wall segment terminates in the vessel bottom 30. Disk-shaped closure member 31 rests on shoulder 27 and is held in place by dimples 32 which form inwardly protruding nodules to maintain closure member 31 in a substantially fixed position if vessel 24 is subjected to shocks and vibrations during handling and transportation in the distribution of device 23. Closure member 31 is formed from paper, plastic, aluminum or any other convenient material and is readily removed by tab 33 which is adhered to closure member 31 and extends upwardly for convenience in grasping tab 33. When in place in vessel 24, closure member 31 effectively retains and seals from atmospheric moisture and contamination disk 10 and beverage flavoring material 34. Disk 10 is conveniently fixedly secured to vessel 24 by pressing disk 10 into bottom wall segment 29 so that the circular peripheral wall of disk 10 is inscribed within the polygonal interior of wall segment 29. This insures that disk 10 appears to be an integral part of vessel 24 when beverage carbonation device 23 is used for the carbonation and consumption of a beverage.

Flavoring material 34 can be in either particulate, disk or any other convenient and readily dissolvable form. The illustrated duodecagonal shape of bottom wall segment 29 is not critical to the operability of device 23, but aids in the formation of the convection currents by permitting aqueous solution to be drawn down the side openings between vessel wall 29 and disk 10, circulating under and through the cells (illustrated in FIG. 1) of disk 10 to establish radially symmetrical convection currents which aid in the dissolution of flavoring material 34. Of course, equally desirable results are obtained when disk 10 has a polygonal, rather than a circular, peripheral wall and is circumscribed by a circular bottom wall segment 29.

Vessel 24 may be shaped so as to be adapted to utilize in a nesting arrangement with other similar vessels, as is conventional in the packaging art. Such an arrangement would provide a more efficient means of distribution of device 23, as a plurality of devices in nesting arrangement consumes less bulk and provides for simpler packaging operations than this same number when otherwise packaged. In this regard, a nesting array of device 23 can be conveniently and economically packaged in a cylindrical canister, similar to that disclosed in Baur et al., U.S. Pat. No. 3,498,798, issued Mar. 3, 1970.

In order to activate the molecular sieve bodies, they are fired at elevated temperatures. The minimum temperature for firing the bodies is that temperature at which the binder will dry to give a bound product and at which the loss of the water hydration of the molecular sieves will be effected. The maximum temperature for the firing process is the highest temperature at which the molecular sieves are structurally stable. This is generally at or below about 800° C. The optimal firing temperature may vary somewhat depending upon the particular combination of molecular sieve types and binders used in the formation of carbonation bodies. However, one skilled in the art may readily ascertain such minimum and maximum temperature data from published sources. In fact, it has been found that varying the molecular sieve type or the clay binder does not affect the firing temperature for the bodies to any great extent. Thus, the selection of a firing temperature will not be drastically changed, and need not even be changed at all, when a variation is made in the molecular sieves or clay binder.

It has been found that the operable firing temperatures for the carbonation bodies of the present invention cover a fairly broad range. A firing temperature range of from about 350° C to about 700° C, and preferably from about 550° C to about 650° C will produce acceptable carbonation bodies for use in the present invention.

The molecular sieve bodies are "loaded", that is, charged, with carbon dioxide merely by contacting the activated sieve material with gaseous carbon dioxide under anhydrous conditions to bring about carbon dioxide absorption. Typically, the sieve materials can be dehydrated to about 2% by weight water. It is not necessary that the composite bodies be contacted with carbon dioxide for an extremely long period of time in order to achieve adequate absorption of carbon dioxide by the molecular sieves, as it has been found that after contacting the molecular sieve bodies with carbon dioxide for only 5 minutes, 70% of the total capacity of the bodies for carbon dioxide absorption has been exhausted through adsorption of carbon dioxide by the molecular sieves. For use in the instant beverage carbonation devices, the molecular sieves should be loaded to the extent of at least about 5% by weight (i.e., weight of carbon dioxide adsorbed/weight of loaded sieves × 100%). The extent to which a particular size of sieves, i.e., sieves with a given pore size, adsorb carbon dioxide at any particular temperature or pressure is easily determined by experimentation or by utilization of adsorption data available for commercially available sieves.

It is important that the carbon dioxide-loaded molecular sieve bodies be packaged and stored in a manner which will prevent contact with atmospheric moisture prior to use in the present invention. Such atmospheric moisture would displace carbon dioxide rendering the sieves ineffective for beverage carbonation.

The carbon dioxide-loaded molecular sieves are contacted with an aqueous potable liquid to effectuate the carbonation of the aqueous beverage. Carbon dioxide is released from the molecular sieves by the preferential adsorption of water from the beverage solution. A carbonated beverage results when this released carbon dioxide is dissolved in the aqueous liquid. Subsequent release of this dissolved carbon dioxide in the mouth upon drinking provides the characteristic feel and taste of a carbonated beverage. Of course, the extent of carbonation increases as more carbon dioxide is dissolved. Carbonation is usually measured in a unit, hereinafter referred to as "volumes of dissolved $CO_2$" or "volumes of carbonation" defined as the volume of gas (reduced to standard conditions, i.e., 760 mmHg and 32° F.) which at the temperature and pressure of carbonation is dissolved in a given volume of beverage. It is herein determined gravimetrically by driving the carbon dioxide out of solution by heating and carrying it with a nitrogen purge into an absorbing bed of Ascarite, commercially available sodium hydroxide on asbestos.

The solubility of carbon dioxide in aqueous solution is strongly a function of temperature and pressure. Solubility data under various temperature and pressure conditions can easily be determined from prior art literature. Thus, certain temperature and pressure limitations apply to the carbonation bodies of the present invention. The solubility of carbon dioxide in pure water approaches 0.5 volumes of dissolved $CO_2$ (a weakly carbonated beverage) at approximately 110° F. and 1 atmosphere. Accordingly, carbonation temperatures above 110° F. are not desirable in the practice of the present invention. There is no theoretical lower temperature limit for use of the instant carbonation bodies, but there is, of course, the practical lower limit of the freezing point of the particular aqueous beverage solution being carbonated. A highly preferred carbonation temperature is that of an ice-containing beverage mixture, i.e., approximately 32° F.

Likewise, beverage carbonation with molecular sieve bodies becomes unacceptably inefficient at carbonation pressures below one atmosphere. Carbonation pressures above one atmosphere enhance carbon dioxide solubility and render molecular sieve beverage carbonation especially effective. In one of its aspects, therefore, the present invention encompasses carbonation in closed vessels wherein pressures of up to about 10 atmospheres are developed. From the practical standpoint of in-home or point-of-consumption carbonation, however, atmospheric pressure, i.e., open container carbonation, is preferred in many instances.

Carbonation time is important in many applications but is not a critical variable in the composite carbonation bodies of the present invention. Time of contact of the loaded molecular sieve disks with the beverage liquid will naturally vary with the amount of aqueous solution present; the nature of that solution; the amount, type, and level of charge of the molecular sieves employed; and the "strength" of carbonated beverage desired. By employing molecular sieves loaded with carbon dioxide to the extent of at least 5% by weight and by carbonating at temperature and pressure conditions of the present invention, suitably carbonated beverages can be obtained after typical in-home carbonation times (1–5 minutes). Carbonation systems providing carbon dioxide release for longer or shorter times than typical can be achieved by utilizing other molecular sieve types and clay binders than those illustrated in the Examples below.

The type of beverage solution to be carbonated by the process of the instant invention is not critical. The beverage liquid must, of course, be aqueous in nature. Such liquids can contain in addition to water, any type of non-interfering flavorant, coloring agent, food additive, medicine, or alcohol. Such materials can alternatively be incorporated into the carbon dioxide-loaded molecular sieve bodies which can then be used to form flavorful carbonated beverages from tap water. In still another variation, flavorings and colorings can be provided in an aqueous mixture which is added to water along with the carbon dioxide-loaded molecular sieve disks. Example of the types of beverage which can be made from suitable liquids by carbonation with the present invention include soft drinks, medicinal preparations, beer and sparkling wine.

Certain solutes which might be present in beverage solutions can, however, affect carbon dioxide dissolution, and certain preferred embodiments of the instant invention are particularly useful when such solutes are involved. Although artificial sweeteners such as saccharin and saccharin-containing compositions appear to have little effect on molecular sieve beverage carbonation, various natural sweeteners retard the rate and extent of carbonation from molecular sieves. For example, fructose, sucrose and glucose at levels of typical soft drink beverages noticeably inhibit carbonation of beverages containing them. It has been found, however, that for carbonation of solutions containing fructose or glucose, molecular sieves with a ten Angstrom pore size provide much better carbonation rate results than with comparable solutions containing sucrose.

The presence of the common food acid components, such as citric acid, up to the level of about 1% appears to have very little effect on the rate or extent of beverage carbonation by molecular sieve bodies. Such food acid-containing drinks, however, necessarily are rather low pH solutions (a 1% aqueous citric acid solution, for example, has a pH of 2). Prolonged contact of such solutions with many synthetic molecular sieve materials will result in gradual leaching of metal ions from the sieve material. As a result the pH of such beverages may rise to the extent that noticeable flavor changes occur. Accordingly, when food acid-containing beverage liquids are being carbonated in accordance with the present invention, it is preferred to utilize acid-resistant molecular sieves described above, i.e., crystalline metal aluminosilicates having an $SiO_2/Al_2O_3$ molar ratio of at least 3 which have had at least 35% of the exchangeable metal ions removed or replaced with protons.

When carbon dioxide is releaased quickly in the solution from molecular sieves, it is not generally as efficiently dissolved as when release rates are slower. Slower release rates in general provide better opportunity for gas-liquid contact and therefore promote carbon dioxide dissolution. As has been previously discussed, one method of reducing the rate of carbon dioxide displacement by water from molecular sieves resides in employing at least some molecular sieves having pore sizes of from 3 to 5 Angstroms.

However, as has already been noted, the rate of dissolution of carbon dioxide into solution is inversely related to the saturation thereof. This factor tends to minimize the effect of an inefficient rapid release of the carbon dioxide from the molecular sieves, and in fact, it is preferred that there be a quick initial release of carbon dioxide into the beverage to be carbonated so as to rapidly carbonate the aqueous beverage. Further, in a carbonated beverage, while the absolute carbonation level is important to consumer desirability as a carbonated beverage, it has been found that the "appearance" of carbonation, that is, the evolution of small carbon dioxide bubbles from the aqueous beverage also promotes the perception of apparent carbonation. Hence, in a commercial application of the composite bodies of the present invention as carbonation disks, it is preferred that the carbon dioxide be released from the molecular sieves at a rate faster than it can be dissolved in solution so as to effect the evolution of carbon dioxide bubbles from solution.

In some applications it may be desirable to use a mixed molecular sieve/chemical couple system. Chemical couples are generally less expensive per volume of released carbon dioxide than are molecular sieves. The off-flavor of the salts from carbon dioxide releasing chemical couples are barely noticeable, if at all, in low levels (which vary with the chemicals in the couple, the flavorings in the beverage and the acuity of the consumer). Typically, about 0.5 to 0.75 volumes of dissolved carbon dioxide (a weakly carbonated beverage) can be achieved in a carbonated cola beverage via a chemical couple without achieving undesirably high levels of (i.e., noticeable off-flavors due to) salts. Consequently a desirable way to achieve carbonation is with a low level of chemical couple carbonation supplemented by molecular sieve carbonation. In such a mixed system, it may be advantageous to use molecular sieves of a smaller pore size variety (i.e., about 3 to 5 Angstroms) for slow release to complement the fast release chemical couple. If such a mixed system is employed the composite bodies with the plurality of elongated channels provide a convenient means for separation of the acid and base components of a chemical couple. The elongated channels provide a natural receptable to keep each component separate until the body is immersed in the aqueous beverage. Only then, with the dissolution of the respective components, will the chemical couple system produce carbon dioxide for carbonating the beverage. Alternatively, the respective components can be coated on separate parts of the composite body to effect a quick dissolution when the body is immersed in the beverage.

The following examples serve to illustrate various embodiments of the present invention and are not intended to limit the present invention in any way.

EXAMPLE I

Rigid, composite molecular sieve bodies of the present invention were formed in the following manner: 726 g. of sodium zeolite Y molecular sieves having a moisture content of 41.74% (such as are commercially available from the Material Systems Division of Union Carbide Corp.), and 100 g. of a clay binder which consisted of a mixture of about 50% of refined white bentonite, and about 50% of a mixture of Texas ball clay, Texas talc, calcined talc and feldspar (this mixture is commercially available under the trade name "Prepared Wall Tile Body" from the Georgia Kaoline Company) were mixed in a Hobart Model C-100 Planetary Paddle Mixer for approximately 4 minutes at 60 rpm. Thereafter, 15 grams of sodium silicate solution was added to the mixture and mixing was continued for an additional 4 minutes. With the mixer operating, 134 grams of water was added to the mixture over a period of approximately 1 minute. Mixing was then continued for an additional 10 minutes resulting in a mixture in the form of a soft, homogeneous, plastic mass. Using an Enerpac hydraulic press, the plastic mass was extruded through a die plate to obtain an extrudate in the form of a cylinder containing small, square, longitudinal, parallel channels separated by thin walls. The cylinder was then sliced into disks using a thin wire. The disks had the following approximate dimensions:

Diameter; 2 inches
Thickness; 0.5 inches
Number of Holes; 120
Shape and Size of Holes square; 0.12 inches by 0.12 inches
Thickness of walls between holes; 0.04 inches The molecular sieve disks were then placed on a wire rack support and dried in a stream of air for approximately 16 hours at room temperature (approximately 70° F). The dried disks were placed in a Blue M kiln manufactured by the Blue M Electric Co., Blue Island, Ill., which was at room temperature (approximately 70° F). The temperature was then gradually increased to 600° C over a period of approximately 1 hour. The temperature was held at 600° C for 5 hours for firing and activation of the molecular sieves. At the end of this firing period, the surface area/mass ratio of the disks was approximately 16 $cm^2/g$. and the weight of one body was about 15 g.

The heated disks were removed from the kiln and immediately transferred to a metal container equipped with a tightly fitting lid and entrance and exit ports permitting circulation of gases through the container. Carbon dioxide gas was then passed through the container for approximately 16 hours at atmospheric pressure, a quantity of which gas was absorbed by the disks. At the end of the charging period, each disk had adsorbed 2.63 g. of carbon dioxide.

The disks, which at this time had reached room temperature, were removed from the metal container and transferred to glass jars. The lids of the jars were immediately closed, protecting the disks from the influence of atmospheric moisture until they were removed to carbonate an aqueous beverage.

A disk, made and charged with carbon dioxide as described above, was placed in an empty 12 oz. cup. Ice and a commercially available cola syrup were than added and the cup was filled with water. Rapid evolution of carbon dioxide in the form of numerous tiny gas bubbles ensued, and a sparkling, effervescent, carbonated beverage, similar to conventional, commercial carbonated cola beverages obtained directly from a bottle, resulted in less than 1 minute. The beverage had the "bite" or "tang" of carbon dioxide as commonly observed in carbonated beverages and had no off-flavor or off-odor. The evolution of gas bubbles continued for more than 8 minutes. Subsequent examination showed that the disk had not changed in size or shape.

Another disk, made and charged with carbon dioxide as described above, was pressed into the bottom polygonal-shaped section of a drinking cup. The disk was fixedly secured at the bottom of the cup so as to become an integral part of the drinking cup. A cola beverage was then made, as described above, and a sparkling, effervescent beverage resulted in a short period of time, as the convection currents produced by the effervescing disk aided in the dissolution of the cola syrup.

Another charged disk, similar to the other disks, was analyzed for its carbonation properties. The results were as follows:

| Minutes after Immersion of Body | Carbonation (Volumes $CO_2$ Dissolved in Beverage) |
| --- | --- |
| 1 | 1.11 |
| 2 | 1.43 |
| 4 | 1.55 |
| 6 | 1.56 |
| 10 | 1.57 |
| pH (initial) | 2.31 |
| pH (after 15 minutes) | 2.88 |
| Time of gas evolution (Minutes) | 8 |

EXAMPLE II

A homogenous, wet, plastic extrusion mixture was prepared using the same materials, formula, equipment and methods as described in Example I. The mixture was divided into two substantially equal parts denoted as Part A and Part B.

Part A was extruded as described in Example I using a hydraulic press and die plate. The extrudate was cut into disks, each of which had 120 holes as previously described. Part B was extruded in the same manner but the die plate was removed from the die housing. The resulting extrudate was a solid cylinder two inches in diameter. The cylinder was cut with a wire into solid disks, having the same thickness, that is, the vertical dimension of the disks, as the disks obtained in Part A. Of course, the disks of part B had no holes, i.e., the longitudinal channels extending from one surface to the opposite surface of the body as was obtained in Part A.

Disks obtained from Part A and Part B were then dried, heated, and charged with equal amounts of carbon dioxide as described in Example I.

The surface area:mass ratio was 16.6 cm$^2$/g. for disks A and 2.2 cm$^2$/g. for disks B (all in the uncharged state).

Subsequent analysis showed that disks A had a much faster carbonation rate than disks B with the average rates as follows:

| Carbonation (Volume $CO_2$) | Body A (120 hole) | Body B (solid) |
| --- | --- | --- |
| After 1 min. | 1.01 | 0.30 |

-continued

| Carbonation (Volume $CO_2$) | Body A (120 hole) | Body B (solid) |
| --- | --- | --- |
| After 4 min. | 1.24 | 0.68 |

The gas release rate for disk B was too slow to produce an acceptable carbonated beverage while disks A produced high quality carbonated beverages.

EXAMPLE III

Example II was repeated using an extrusion mixture with the same composition used in Example II, except that 10% less bentonite clay was used, and a correspondingly larger amount of Texas ball clay, Texas talc, calcined talc, and feldspar was used to achieve the same final mixture weight.

Two sets of disks were produced as in Example II. Set A consisted of disks with 120-holes while set B contained disks without holes, i.e., solid disks. All disks were dried, heated and charged with carbon dioxide as in Example II. Subsequent analysis showed that disks A had a much faster carbonation rate than disks B with the average rates as follows:

| Carbonation (Volume $CO_2$) | Bodies (120 hole) | Bodies (solid) |
| --- | --- | --- |
| After 1 min. | 1.04 | 0.63 |
| After 4 min. | 1.31 | 0.89 |

The gas release rate for disks B was too slow to produce satisfactory carbonated beverages. Disks A produced high quality carbonated beverages when put in an aqueous solution.

EXAMPLE IV

Four different extrusion mixtures were prepared using the same equipment and methods as in Example I. The mixtures, designated as A, B, C, and D, had the following composition (in grams):

| Ingredients | A | B | C | D |
| --- | --- | --- | --- | --- |
| Sodium zeolite X powder* | 400 | 400 | 400 | 400 |
| Refined white bentonite | — | 20 | 40 | 100 |
| A mixture consisting of Texas Ball clay, Texas talc, calcined talc and feldspar | 100 | 80 | 60 | — |
| Guar gum | 15 | 15 | 15 | 15 |
| Water | 450 | 520 | 470 | 426 |

*Such as may be commercially obtained as Type 13X powder available from the Material Systems Division of Union Carbide Corp.

The mixtures were extruded as in Example I except that the die plate used produced a cylindrical extrudate with 80 channels. The extrudate was sliced into disks which, of course, had 80 holes, and subsequently dried, heated and charged with carbon dioxide as in Example I, except that charging pressure was 100 psig and charging time was 24 hours.

Subsequent examination showed the different proportions of binder materials affected the carbonation rate, i.e., that disks A had a very fast gas release rate, disks B and C had intermediate gas release rates, and disks D had a slow gas release rate. All compositions, however, yielded bodies suitable for use in the present invention.

EXAMPLE V

Example IV was repeated using the same equipment and methods except that the bodies were charged with carbon dioxide for 5½ hours and the following three extrusion mixtures were used. (in grams):

| Ingredient | A | B | C |
|---|---|---|---|
| Sodium zeolite Y powder | 693 | 693 | 693 |
| Refined white bentonite | — | 50 | 100 |
| A mixture consisting of Texas Ball clay, Texas talc, calcined talc and feldspar | 100 | 50 | — |
| Guar gum | 15 | 15 | 15 |
| Water | 488 | 488 | 437 |

Examination of the charged disks shows that disks A had an extremely fast carbonation rate, disks B had an intermediate carbonation rate, and disks C had a slow carbonation rate. All compositions yielded bodies suitable for the practice of this invention, in that all disks provided a fully carbonated beverage within 2 minutes.

EXAMPLE VI

A set of extruded disks was prepared using the same equipment and methods as in Example I. The composition of the extrusion mixture was as follows:

| Ingredient | Weight (g) |
|---|---|
| Sodium zeolite Y powder | 762 |
| Refined white bentonite | 50 |
| A mixture consistng of Texas Ball clay, Texas talc, calcined talc and feldspar | 50 |
| Sodium silicate solution | 15 |
| Added water | 85 |
| Total | 962 |

The disks were dried in a microwave oven for 6 minutes at 4KW. Subsequently, the disks were heated for 6 hours at 600° C. as in Example I. After heating, the disks were stored in closed jars until they had cooled to room temperature (approx. 70° F).

Eight disks were individually and accurately weighed in a nitrogen atmosphere. The disks were then exposed to dry carbon dioxide atmosphere for various time intervals. Immediately after exposure, the disks were again weighed in dry nitrogen atmosphere. The amount of carbon dioxide adsorbed by each disk was then calculated using the following equations:

$$A = (F - I/I) \times 100$$

where $A$ equals the percentage amount of carbon dioxide adsorbed, $I$ equals the initial (uncharged) weight of the disk in grams, and $F$ equals the final (charged) weight of the disk in grams. This calculation yielded the following results:

| Body | Charging Time in Carbon Dioxide Atmosphere (min.) | Amount of Carbon Dioxide Adsorbed (Weight %) |
|---|---|---|
| A | 5 | 12.7 |
| B | 10 | 14.3 |
| C | 20 | 17.1 |
| D | 30 | 17.1 |
| E | 60 | 17.8 |
| F | 120 | 18.2 |
| G | 240 | 18.2 |
| H | 360 | 17.9 |

Thus, it can be seen that exposing the activated bodies to an atmosphere of carbon dioxide for only a short time results in the adsorption of sufficient carbon dioxide to effectively carbonate an aqueous beverage in which a body is placed.

EXAMPLE VII

A number of extruded molecular sieve disks were prepared using the same materials, formula, equipment, and methods as described in Example I. All disks were dried in a microwave oven for 6 minutes at 4 KW. The dried disks were divided into four sets, each of which were fired at a different temperature for 6 hours. Subsequently, all disks were charged with carbon dioxide for 16 hours at 100 psig. The amount of carbon dioxide adsorbed by each set of disks was determined by weighing the disk before and after charging as described in Example VI. The results were as follows:

| Disks | Firing Temperature ° C | Amount of Carbon Dioxide Adsorbed (Wt. %) (Average of 3 Bodies) |
|---|---|---|
| A | 550 | 19.45 |
| B | 600 | 20.27 |
| C | 700 | 18.60 |
| D | 750 | 0 |

The gas-adsorbing capability of disks D had been completely destroyed by the high firing temperature. Examination of the immersed disks after carbon dioxide gas evolution had stopped showed that disks A had less mechanical strength than the others, but were still acceptable for use in the present invention.

EXAMPLE VIII

Rigid, composite molecular sieve bodies of the present invention were formed in the following manner: 10,031 g. of sodium zeolite X molecular sieves (such as are commercially available from the Material Systems Division of Union Carbide Corporation), 1255 g. of refined white bentonite and 1255 g. of a mixture consisting of Texas ball clay, Texas talc, calcined talc and feldspar (such as is commercially available from the Georgia-Kaolin Co.), were placed in a mix-muller and mixed for approximately 3 minutes. Thereafter, 9217 g. of water was added and the mixture was mixed for an additional 5 minutes to form a plastic mixture suitable for forming the composite bodies of the present invention. Based on the initial water content of the dry ingredients added to the additional water, the absolute moisture content of the mixture was calculated to be 42.9%.

The mixture was then extruded through a 4-inch Bonnot screw extruder with a die plate. The extrudate was in the form of a cylinder containing 80 small, square, cross-sectional, longitudinal, parallel channels separated by thin walls. The cylinder was cut into disks using a thin wire to produce carbonation disks having 80 holes running from one planar surface to the opposite planar surface.

After drying in air for about 16 hours at approximately 68° F, the disks were fired for 6 hours at 600° C and subsequently charged with carbon dioxide for 6 hours at atmospheric pressure.

Several disks were then analyzed for their carbonation properties and were found to each give a substantially equal performance for carbonation purposes. The average results were as follows:

| Minutes after Immersion of Body | Carbonation (Volumes $CO_2$ Dissolved in Beverage) |
|---|---|
| 1 | 0.96 |
| 2 | 1.15 |
| 4 | 1.45 |
| 6 | 1.34 |
| 10 | 1.32 |

Another disk was placed in an empty 12-ounce cup. Ice and a commercially available cola concentrate syrup were added and the cup was then filled with water. Rapid evolution of gas bubbles ensued, and a sparkling, effervescent carbonated beverage was produced. Upon tasting the carbonated cola beverage, no noticeable off-flavors were produced and a subsequent examination showed that the disk had not changed in shape or size.

EXAMPLE IX

Rigid composite molecular sieve bodies of the present invention are formed in the following manner: 1400 g. of synthetic mordenite (such as is commercially available from the Norton Chemical Process Products Division as Zeolon 900) and 594 g. of water are thoroughly mixed in a mix-muller for approximately 8 minutes. Disks are formed as described in Example VIII, dried in air for 16 hours, and fired at 800° C for 6 hours at atmospheric pressure. Thereafter, the disks are charged with carbon dioxide for 6 hours at about 15 psig. When placed in the bottom of a vessel, ice, a commercially available cola syrup and water are added to produce a sparkling, carbonated beverage with no off-flavor or loose particles present in the beverage from the carbonation disk.

EXAMPLE X

Rigid, composite molecular sieve bodies of the present invention were produced in the following manner: 43.5 parts of sodium zeolite X molecular sieve powder was mixed with 56.5 parts 1,1,1 trichloroethane. To the mixture, 30 parts of a commercially available resilient silicone rubber foam base binder material was added. After thorough admixture, the silicone rubber binder catalyst was added and quickly and vigorously admixed to form a homogenous mass which was then placed in a cylindrical mold. Holes were then pressed into the planar surfaces of the disks using a die with a plurality of projecting pins. After a few minutes, the admixture turned into a rubbery mass which was then sliced into disks of about ½ inch thickness. The disks were then heated to 300° C for 4 hours to dehydrate and activate the molecular sieves. Subsequently, the disks were exposed to carbon dioxide at 1 atmosphere for 19 hours for $CO_2$ absorption.

A disk, made and charged with carbon dioxide as described above, was placed in an empty 8-ounce drinking vessel. Ice and a commercially available cola syrup sweetened to the proper beverage concentration were then added and the cup was filled with water. Evolution of carbon dioxide in the form of numerous tiny gas bubbles ensued, and a sparkling, effervescent, carbonated beverage, similar to conventional, commercial carbonated cola beverages obtained directly from a bottle was produced. The beverage had the "bite" or "tang" of carbon dioxide as commonly observed in carbonated beverages and had no off-flavor or off-odor. It was observed that the evolution of gas bubbles was considerably slower than that observed with a clay binder, as described in Example I; however, the evolution of gas bubbles continued for a longer period of time than that observed when a clay binder was used, thus prolonging the effervescent appearance of a carbonated beverage.

Essentially equivalent results were obtained when the silicone rubber foam base binder was added in an amount of 15 parts, 20 parts, and 25 parts to respective mixtures of sodium zeolite X molecular sieve powder and the 1,1,1 trichloroethane solvent. All samples prepared with the resilient silicone rubber foam base as a binder produced disks which had exceptional attrition resistance; that is, they did not shatter when dropped from a height of approximately 6 feet. Also, all disks produced could easily be cut with a knife with no loose powder evident as a consequence of cutting.

Thus, it is apparent that there has been provided, in accordance with the present invention, a rigid composite body containing crystalline molecular sieves and having liquid-permeable channels extending to the interior thereof that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A rigid composite body comprising crystalline zeolite molecular sieves in an amount of at least 40% of the body weight, said body having a surface area to mass ratio of from about 4 $cm^2/g$. to about 200 $cm^2/g$. and having at least 6 g. of crystalline zeolite molecular sieves distributed substantially uniformly throughout said body wherein said body has adsorbed therein a releasable amount of carbon dioxide which is sufficient to carbonate an aqueous beverage when said body is immersed therein, and; wherein said body has a plurality of substantially parallel elongated channels extending from one surface of said body to the interior of said body with the longitudinal axis of said elongated channels substantially parallel to the axis of the vertical dimension of said body.

2. The body of claim 1 wherein said body comprises of from about 65% to about 95% by weight of molecular sieves and from about 35% to about 5% by weight of a binder material.

3. The body of claim 2 wherein said binder material is a clay binder.

4. The clay binder of claim 3 which comprises at least one clay selected from the group comprising kaolin and kaolin-type clays, kaolinite, attapulgite and attapulgite-type clays, bentonite and bentonite-type clays, sepiolite, polygarskite, plastic ball clays, montmorillonite, illite and chlorite.

5. The body of claim 1 wherein said elongated channels extend from one surface of said body to an opposite surface.

6. The body of claim 5 wherein said body has adsorbed therein at least about 5% by weight of the body of carbon dioxide.

7. The body of claim 1 wherein said body has a surface area to mass ratio of from about 6 cm$^2$/g. to about 50 cm$^2$/g.

8. The body of claim 6 wherein said body has a surface area to mass ratio of from about 10 cm$^2$/g. to about 24 cm$^2$/g.

9. The body of claim 1 wherein said body has a minimum of 8 g. of crystalline zeolite molecular sieves distributed substantially uniformly throughout said body.

10. A rigid composite body suitable for carbonating individual serving portions of aqueous beverages comprising of at least 40% by weight crystalline zeolite molecular sieves, said body having a surface area to mass ratio of from about 4 cm$^2$/g. to about 200 cm$^2$/g., said body containing from about 0.5 g. to about 4 g. of uncharged molecular sieves for each fluid ounce of aqueous beverage to be carbonated and said body having adsorbed therein a releasable amount of carbon dioxide which is sufficient to carbonate an aqueous beverage when said body is immersed therein.

11. The body of claim 10 wherein said body comprises of from about 65% to about 95% by weight of molecular sieves and from about 35% to about 5% by weight of a binder material.

12. The body of claim 10 wherein said binder material is a clay binder.

13. The clay binder of claim 12 which comprises at least one clay selected from the group comprising kaolin and kaolin-type clays, kaolinite, attapulgite and attapulgite-type clays, sepiolite, polygarskite, plastic ball clays, montmorillonite, illite and chlorite.

14. The body of claim 10 wherein said body has a plurality of substantially parallel elongated channels extending from one surface of said body to the interior of said body with the longitudinal axis of said elongated channels substantially parallel to the vertical dimension of said body.

15. The body of claim 14 wherein said elongated channels extend from one surface of said body to an opposite surface.

16. The body of claim 10 wherein said body has adsorbed therein at least about 5% by weight of the body of carbon dioxide.

17. The body of claim 10 wherein said body has a surface area to mass ratio of from about 6 cm$^2$/g. to about 50 cm$^2$/g.

18. The body of claim 16 wherein said body has a surface area to mass ratio of from about 10 cm$^2$/g. to about 24 cm$^2$/g.

19. The body of claim 9 wherein said body contains from about 0.67 g. to about 2 g. of uncharged molecular sieves for each fluid ounce of aqueous beverage to be carbonated.

20. A rigid composite body comprising of at least 40% by weight of crystalline zeolite molecular sieves, said body having a plurality of substantially parallel elongated channels extending from one surface of said body to an opposite surface with the longitudinal axis of said elongated channels substantially parallel to the axis of the vertical dimension of said body, said body having a surface to mass ratio of at least about 4 cm$^2$/g., and said body having adsorbed therein a releasable amount of carbon dioxide which is sufficient to carbonate an aqueous beverage when said body is immersed therein.

21. The body of claim 20 wherein said body comprises of from about 65% to about 95% by weight of molecular sieves and from about 35% to about 5% by weight of binder material.

22. The body of claim 21 wherein said binder material is a clay binder.

23. The clay binder of claim 22 which comprises at least one clay selected from the group comprising kaolin and kaolin-type clays, kaolinite, attapulgite and attapulgite-type clays, bentonite and bentonite-type clays, sepiolite, polygarskite, plastic ball clays, montmorillonite, illite and chlorite.

24. The body of claim 20 wherein said body has adsorbed therein at least about 5% by weight of the body of carbon dioxide.

25. The body of claim 20 wherein said body has a surface area to mass ratio of from about 6 cm$^2$/g. to about 50 cm$^2$/g.

26. The body of claim 20 wherein said body has a surface area to mass ratio of from about 10 cm$^2$/g. to about 24 cm$^2$/g.

* * * * *